United States Patent
Ino

(10) Patent No.: US 11,700,144 B2
(45) Date of Patent: Jul. 11, 2023

(54) MASTER SLAVE COMMUNICATION SYSTEM AND CONTROL METHOD FOR MASTER SLAVE COMMUNICATION SYSTEM

(71) Applicant: CANON KABUSHIKI KAISHA, Tokyo (JP)

(72) Inventor: Koichiro Ino, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 136 days.

(21) Appl. No.: 17/196,331

(22) Filed: Mar. 9, 2021

(65) Prior Publication Data
US 2021/0297283 A1 Sep. 23, 2021

(30) Foreign Application Priority Data
Mar. 17, 2020 (JP) ................ 2020-046797

(51) Int. Cl.
*H04L 12/40* (2006.01)
*H04L 12/403* (2006.01)
*H04L 61/5053* (2022.01)

(52) U.S. Cl.
CPC ...... *H04L 12/40045* (2013.01); *H04L 12/403* (2013.01); *H04L 12/40019* (2013.01); *H04L 61/5053* (2022.05)

(58) Field of Classification Search
CPC ......... H04L 12/40045; H04L 12/40019; H04L 12/403; H04L 61/5053; H04L 61/5038; H04L 12/40169
See application file for complete search history.

(56) References Cited

U.S. PATENT DOCUMENTS

| | | | | |
|---|---|---|---|---|
| 5,488,693 A | * | 1/1996 | Houck | H04L 9/40 709/236 |
| 2007/0133569 A1 | * | 6/2007 | Lee | H04L 12/2825 370/395.2 |
| 2008/0040515 A1 | * | 2/2008 | Schaetzle | G05B 19/0421 710/3 |
| 2013/0198427 A1 | * | 8/2013 | Leitner | G06F 13/404 710/110 |
| 2021/0049121 A1 | * | 2/2021 | Buenaventura | G06F 13/37 |

FOREIGN PATENT DOCUMENTS

JP H05292098 A 11/1993

* cited by examiner

*Primary Examiner* — Vineeta S Panwalkar
(74) *Attorney, Agent, or Firm* — Rossi, Kimms & McDowell LLP

(57) ABSTRACT

A master slave communication system capable of reducing a manufacturing cost is provided. The mater slave communication system includes a master node and a plurality of slave nodes having the same initial address. A communication between the master node and one slave node among the plurality of slave nodes is established by using the initial address set as an address of the one slave node. The address of the one slave node is changed into another address which has been transmitted from the master node to the one slave node through the established communication and is different from the initial address.

13 Claims, 4 Drawing Sheets

*FIG. 4*

|  | SLAVE NODE A | SLAVE NODE B | SLAVE NODE C |
|---|---|---|---|
| INITIAL ADDRESS | 0000100 | 0000100 | 0000100 |
| ADDRESS SET AFTER SLAVE ADDRESS SETTING PROCESS | 0000101 | 0000110 | 0000100 |

MASTER SLAVE COMMUNICATION SYSTEM AND CONTROL METHOD FOR MASTER SLAVE COMMUNICATION SYSTEM

BACKGROUND OF THE INVENTION

Field of the Invention

The present invention relates to a master slave communication system capable of reducing a manufacturing cost, an electronic device, a control method for the master slave communication system, and a control method for the electronic device.

Description of the Related Art

There is known a master slave communication system in which a master node, which is an electronic device, communicates with a plurality of slave nodes. A unique address is assigned to each of the plurality of slave nodes. The master node communicates with a slave node corresponding to a designated address among the plurality of slave nodes. In the master slave communication system, for example, an address of each slave node is set by using an address setting terminal provided in each slave node. Moreover, for example, an assigned address is stored in advance in a ROM provided in each slave node, and the address read out from each ROM is set as an address of each slave node (for example, see Japanese Laid-Open Patent Publication (kokai) No. H05-292098).

As described above, however, in a case where the address of each slave node is set by using the address setting terminal, all the slave nodes need to be provided with the address setting terminal. In this case, in the master slave communication system, the number of components is increased, and this increases a size of a package and brings about an increase in a manufacturing cost.

In a case where an address read out from the ROM of each slave node is set as an address of each slave node as the technique disclosed in Japanese Laid-Open Patent Publication (kokai) No. H05-292098 described above, a certain working time is necessary to write the above address in the ROM of each slave node and to manage the address written in the ROM. As a result, the manufacturing cost increases. That is, in the conventional technique, a problem of increasing the manufacturing cost concerning setting of the address of the slave node arises.

SUMMARY OF THE INVENTION

The present invention provides a master slave communication system capable of reducing a manufacturing cost, an electronic device, a control method for the master slave communication system, and a control method for the electronic device.

Accordingly, the present invention provides a mater slave communication system including a master node and a plurality of slave nodes having the same initial address, comprising at least one processor, the at least one processor functioning in accordance with a program stored in a memory as a communication establishing unit that establishes a communication between the master node and one slave node among the plurality of slave nodes by using the initial address set as an address of the one slave node, an address changing unit that changes the address of the one slave node into another address which has been transmitted from the master node to the one slave node through the established communication and is different from the initial address.

According to the present invention, the manufacturing cost concerning the setting of the address of the slave node is reduced.

Further features of the present invention will become apparent from the following description of exemplary embodiments with reference to the attached drawings.

BRIEF DESCRIPTION OF THE DRAWINGS

FIG. 4 is a view for explaining how to change an address of each slave node in FIG. 1.

DESCRIPTION OF THE EMBODIMENTS

The present invention will now be described in detail below with reference to the accompanying drawings showing embodiments thereof.

Figure 1:
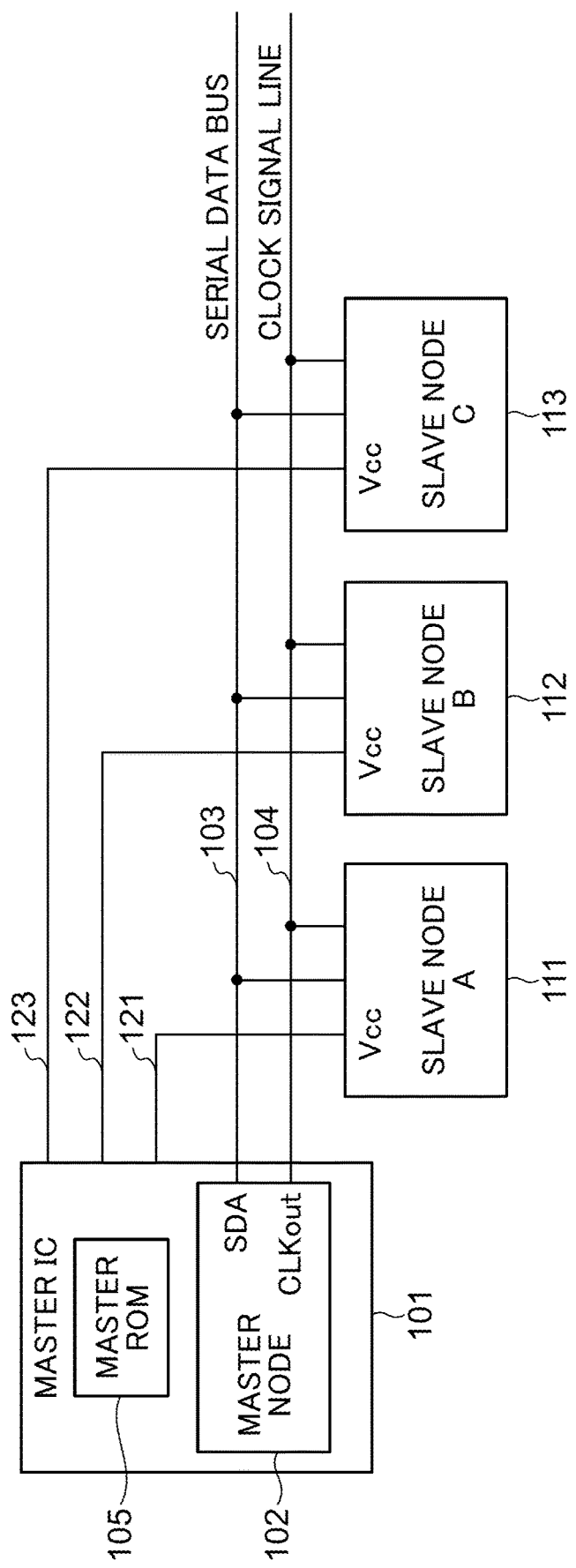
FIG. 1 is a block diagram schematically showing a configuration of a master slave communication system according to an embodiment of the present invention.

FIG. 1 is a block diagram schematically showing a configuration of a master slave communication system 100 according to an embodiment of the present invention. In FIG. 1, the master slave communication system 100 includes a master IC 101 and a plurality of slave nodes. In the present embodiment, a description will be given of a configuration of the master slave communication system 100 including three slave nodes, specifically, a slave node A 111, a slave node B 112, and a slave node C 113, as an example. It should be noted that the number of slave nodes included in the master slave communication system 100 is not limited to three, and it may be two or more than four. For example, when a data length of an address of a slave node is 8 bits, a maximum number of slave nodes is 2$^8$-1, namely, 255.

The master IC 101 includes one or more master nodes and a master ROM 105. In the present embodiment, a description will be given of a configuration of the master slave communication system 100 including a master node, specifically, a master node 102, as an example.

The master node 102 includes a data output terminal (SDA) and a clock output terminal (CLKout). The data output terminal is connected to a serial data bus 103, and the clock output terminal is connected to a clock signal line 104. The slave node A 111, the slave node B 112, and the slave node C 113 are connected in parallel to the serial data bus 103 and the clock signal line 104, respectively. As described above, in the master slave communication system 100, the plurality of slave nodes is hanging from and connected to a master node.

In the master slave communication system 100, an I2C communication is used as a communication system, for example. In the I2C communication, the master node 102 outputs a clock signal for a serial communication from the clock output terminal to the clock signal line 104, and outputs a data signal from the data output terminal. A slave node designated by the master node 102 among the slave node A 111, the slave node B 112, and the slave node C 113 reads a data signal of the serial data bus 103 at a rising edge of the clock signal. In the following description, a communication performed by the master node 102 with each slave node via the serial data bus 103 and the clock signal line 104 is referred to as the "master slave communication".

Moreover, the master IC 101 supplies the slave node A 111, the slave node B 112, and the slave node C 113 with an electric power. In FIG. 1, the master IC 101 supplies the electric power from a power supply line 121 to the slave node A 111, supplies the electric power from a power supply line 122 to the slave node B 112, and supplies the electric power from a power supply line 123 to the slave node C 113. It should be noted that in the following description, the electric power supplied from the power supply line 121 to the slave node A 111 is referred to as a "Vcc-A", the electric power supplied from the power supply line 122 to the slave node B 112 is referred to as a "Vcc-B", and the electric power supplied from the power supply line 123 to the slave node C 113 is referred to as a "Vcc-C". The master IC 101 is able to perform an ON/OFF control of an electric power supply individually for the power supply lines 121 to 123. A master ROM 105 stores a first change address and a second change address, to be described below. The first change address and the second change address are used for a slave address setting process, to be described below by referring to FIG. 3, to set an address of each slave node used in the master slave communication.

Next, configurations of the slave node A 111, the slave node B 112, and the slave node C 113 will be explained. As shown in FIG. 1, the slave node A 111, the slave node B 112, and the slave node C 113 are configured not to include an address setting terminal to set an address. It should be noted that in the present embodiment, the slave node A 111, the slave node B 112, and the slave node C 113 have the same configuration, and in the following description, the configurations of the slave nodes are explained by using the slave node A 111 as an example. It should be noted that in the following description, component elements of the slave node B 112 will be explained by replacing "A" at ends of names of component elements of the slave node A 111 with "B", and component elements of the slave node C 113 will be explained by replacing "A" at the ends of the names of the component elements of the slave node A 111 with "C".

Figure 2:
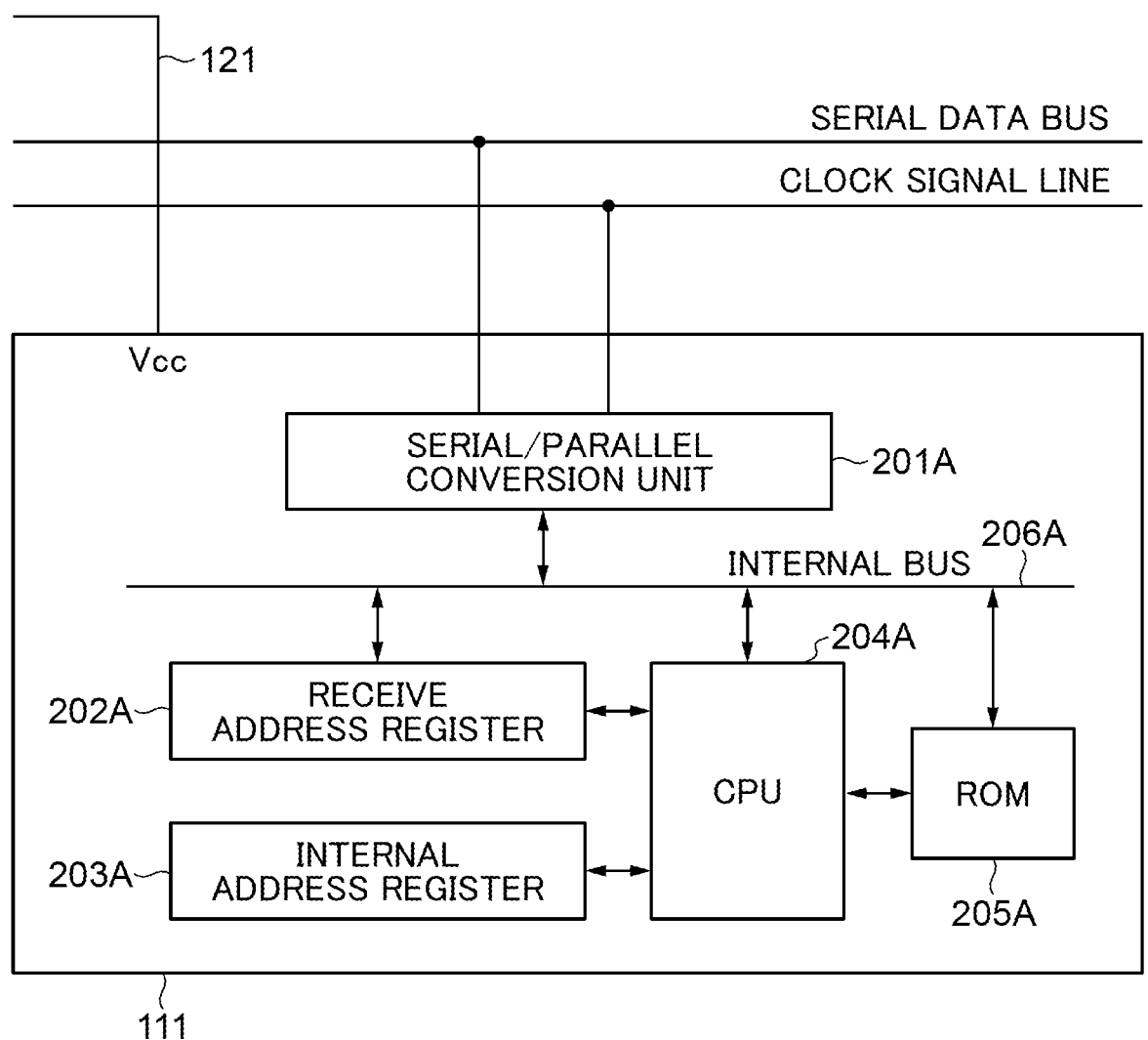
FIG. 2 is a block diagram schematically showing a configuration of a slave node in FIG. 1.

FIG. 2 is a block diagram schematically showing the configuration of the slave node A 111 in FIG. 1. In FIG. 2, the slave node A 111 includes a serial/parallel conversion unit 201A, a receive address register 202A, an internal address register 203A, a CPU 204A, and a ROM 205A. The serial/parallel conversion unit 201A, the receive address register 202A, the CPU 204A and the ROM 205A are mutually connected via an internal bus 206A. The internal address register 203A is connected to the CPU 204A.

The serial/parallel conversion unit 201A is connected to the serial data bus 103 and the clock signal line 104. The serial/parallel conversion unit 201A imports a data signal output from the master node 102 at a timing of a rising edge of a clock signal output from the master node 102. The serial/parallel conversion unit 201A converts a serial data based on the imported data signal into a parallel data and outputs the parallel data to the internal bus 206A. Moreover, the serial/parallel conversion unit 201A converts the parallel data received via the internal bus 206A into the serial data via the internal bus 206A and outputs a data signal of the serial data to the serial data bus 103.

The receive address register 202A holds the first change address or the second change address, to be described below, received from the master node 102. The CPU 204A is a computing device which controls an overall operation of the slave node A 111. The ROM 205A stores various types of information necessary for a control by the CPU 204A. The various types of information include an initial address of the slave node A 111, for example. The initial address is used to establish an initial communication with the master node 102.

The slave node A 111 is supplied with the electric power from the master IC 101 via the power supply line 121. When the electric power is not supplied from the master IC 101, the CPU 204A does not operate in the slave node A 111, and a communication between the slave node A 111 and the master node 102 is disabled. This state substantially corresponds to a non-connection state between the slave node A 111 and the master node 102. On the other hand, when the electric power is supplied from the master IC 101, the CPU 204A is activated in the slave node A 111, and the communication between the slave node A 111 and the master node 102 is enabled. This state substantially corresponds to a connection state between the slave node A 111 and the master node 102. Namely, in the present embodiment, a connection state between the master node 102 and each slave node is controlled based on whether the master IC 101 supplies the electric power to each slave node.

Figure 3:
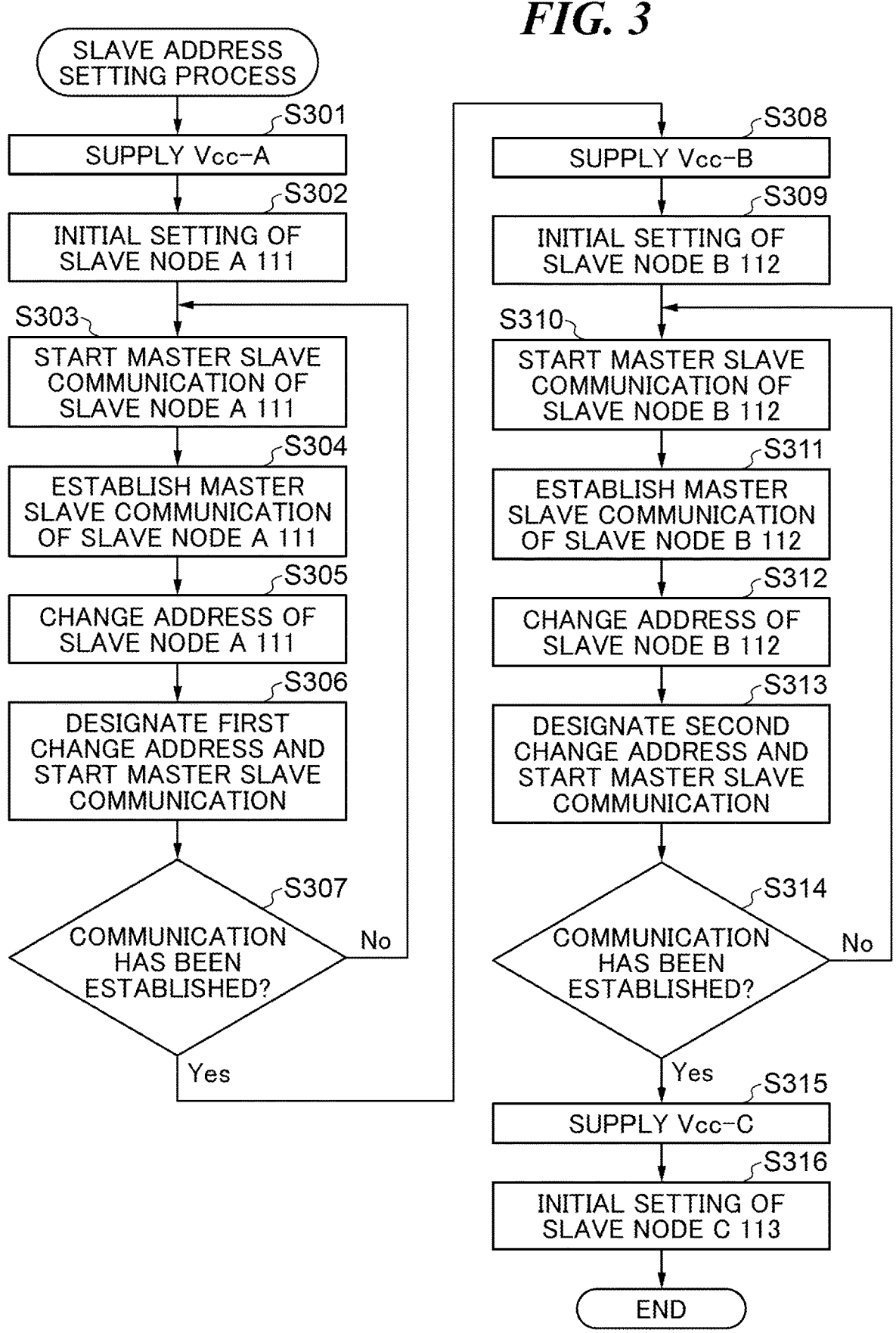
FIG. 3 is a flow chart showing a procedure of a slave address setting process executed by the master slave communication system in FIG. 1.

FIG. 3 is a flow chart showing a procedure of the slave address setting process executed by the master slave communication system 100 in FIG. 1. In the process in FIG. 3, an electric supply from the master IC 101 to all the slave nodes is stopped as an initial state. That is, the slave node A 111, the slave node B 112, and the slave node C 113 are in the non-connection state with the master node 102.

In FIG. 3, the master slave communication system 100 supplies the electric power to one of the slave node A 111, the slave node B 112, and the slave node C 113, for example, the electric power (Vcc-A) to the slave node A 111 (step S301).

Then, the master slave communication system 100 performs an initial setting of the slave node A 111 which has been supplied with the electric power (step S302). Specifically, in the slave node A 111, the CPU 204A transfers the initial address stored in the ROM 205A to the internal address register 203A. Accordingly, the initial address is set as an address of the slave node A 111. The initial address is a value expressed by binary. In the present embodiment, the initial address is "0000100", as an example.

Subsequently, the master slave communication system 100 causes the master node 102 to designate the address "0000100" of the slave node A 111 and starts the master slave communication between the master node 102 and the slave node A 111 (step S303). In the step S303, the master node 102 outputs a data signal which indicates the address "0000100" of the slave node A 111 to the serial data bus 103.

Then, in a case where the serial/parallel conversion unit 201A of the slave node A 111 receives the data signal, the master slave communication system 100 stores the address indicated by the data signal (hereinafter, referred to as a "designated address") in the receive address register 202A. The master slave communication system 100 causes the CPU 204A to compare the designated address stored in the receive address register 202A and an address held in the internal address register 203A, that is, the initial address "0000100" set as the address of the slave node A 111. In a case where two addresses match with each other as a result of the comparison, the master slave communication system 100 establishes the master slave communication between the master node 102 and the slave node A 111 (step S304) (communication establishing unit).

Subsequently, the master slave communication system 100 changes the address of the slave node A 111 (step S305) (address changing unit). Specifically, the master 102 transmits the first change address stored in the master ROM 105 to the slave node A 111 via the serial data bus 103 (transmission unit). The first change address is a unique address in the master slave communication, for example, "0000101" which is different from the initial address. The slave node A 111 transfers the received first change address to the internal address register 203A. As a result, the address of the slave node A 111 is switched from the initial address "0000100" to "0000101" as shown in FIG. 4.

Next, the master slave communication system 100 verifies whether the address of the slave node A 111 is normally switched from the initial address "0000100" to the first change address "0000101". Specifically, the master slave communication system 100 causes the master node 102 to designate the first change address "0000101" and starts the master slave communication with the master node 102 and the slave node A 111 (step S306). Thereafter, the master slave communication system 100 determines whether the master slave communication between the master node 102 and the slave node A 111 has been established (step S307).

In a case where the master slave communication between the master node 102 and the slave node A 111 is not established as a result of the determination in the step S307, the address of the slave node A 111 has not normally been switched from the initial address to the first change address. In this case, the master slave communication system 100 returns the process of the step S303. The master slave communication system 100 again changes the address of the slave node A 111 by causing the master node 102 to designate the initial address "0000100".

In a case where the master slave communication between the master node 102 and the slave node A 111 has been established as a result of the determination in the step S307, the address of the slave node A 111 has normally been switched from the initial address to the first change address. In this case, the master slave communication system 100 starts a setting of an address of a slave node other than the slave node A 111, for example, the address of the slave node B 112. Specifically, the master slave communication system 100 supplies the electric power (Vcc-B) from the master IC 101 to the slave node B 112 (step S308). At this time, the slave node A 111 is continuously supplied with the electric power, and the setting of the address "0000101" of the slave node A 111 is maintained.

Then, the master slave communication system 100 performs an initial setting of the slave node B 112 which has been supplied with the electric power (step S309). In the step S309, an initial address stored in a ROM 205B of the slave node B 112 is set as the address of the slave node B 112, in the same manner as the step S302. Here, the initial address stored in the ROM 205B is the address "0000100" which is same as the initial address stored in the ROM 205A of the slave node A 111.

Subsequently, the master slave communication system 100 causes the master node 102 to designate the address "0000100" of the slave node B 122 and starts the master slave communication between the master node 102 and the slave node B 112 (step S310). In the step S310, the master node 102 outputs a data signal which indicates the address "0000100" of the slave node B 112 to the serial data bus 103.

Then, in a case where a serial/parallel conversion unit 201B of the slave node B 112 receives the data signal, the master slave communication system 100 compares the designated address indicated by the received data signal and the set address (initial address) of the slave node B 112 in the above-described manner. In a case where two addresses match with each other as a result of the comparison, the master slave communication system 100 establishes the master slave communication between the master node 102 and the slave node B 112 (step S311).

Subsequently, the master slave communication system 100 changes the address of the slave node B 112 (step S312). Specifically, the master 102 transmits the second change address stored in the master ROM 105 to the slave node B 112 via the serial data bus 103. The second change address is a unique address in the master slave communication, for example, "0000110" which is different from the initial address and the first change address. The slave node B 112 transfers the received second change address to the internal address register 203B. As a result, the address of the slave node B 112 is switched from the initial address "0000100" to "0000110" as shown in FIG. 4.

Next, the master slave communication system 100 verifies whether the address of the slave node B 112 has normally been switched from the initial address "0000100" to the second change address "0000110". Specifically, the master slave communication system 100 causes the master node 102 to designate the second change address "0000110" and starts the master slave communication with the master node 102 and the slave node B 112 (step S313). Thereafter, the master slave communication system 100 determines whether the master slave communication between the master node 102 and the slave node B 112 has been established (step S314).

In a case where the master slave communication between the master node 102 and the slave node B 112 is not established as a result of the determination in the step S314, the address of the slave node B 112 has not normally been switched from the initial address to the second change address. In this case, the master slave communication system 100 returns the process of the step S310. The master slave communication system 100 again changes the address of the slave node B 112 by causing the master node 102 to designate the initial address "0000100".

In a case where the master slave communication between the master node 102 and the slave node B 112 has been established as a result of the determination in the step S314, the address of the slave node B 112 has normally been switched from the initial address to the second change address. In this case, the master slave communication system 100 starts a setting of an address of the slave node C 113, which is a slave node other than the slave node A 111 and the slave node B 112. Specifically, the master slave communication system 100 supplies the electric power (Vcc-C) from the master IC 101 to the slave node C 113 (step S315). At this time, the slave node A 111 and the slave node B 112 are continuously supplied with the electric power, and the setting of the address "0000101" of the slave node A 111 and the setting of the address "0 00110" are maintained.

Then, the master slave communication system 100 performs an initial setting of the slave node C 113 which has been supplied with the electric power (step S316). In the step S316, the initial address stored in a ROM 205C of the slave node C 113 is set as the address of the slave node C 113, in the same manner as the step S302. Here, the initial address stored in the ROM 205C is the address "0000100" which is same as the initial address stored in the ROM 205A and the ROM 205B. However, the addresses of the slave node A 111 and the slave node B 112 have been changed to the addresses different from the initial address in the step S305 and the step S312, respectively, and thus the address of the slave node C 113 does not be identical with the addresses of the other slave nodes. Then, the master slave communication system 100 terminates the present process.

According to the embodiment described above, the address of the slave node A 111 is changed to the first change address which is different from the initial address and has been transmitted from the master node 102 to the slave node A 111 through the communication established by the process in the step S304. That is, in the setting of the slave node A 111, it is unnecessary not only to write in advance the address of the slave node A 111 into the ROM 205A of the slave node A 111, but to provide the slave node A 111 with the address setting terminal. Accordingly, it is possible to reduce the manufacturing const concerning the setting of the address of the slave node.

Furthermore, according to the embodiment described above, it is determined whether the communication between the master node 102 and the slave node A 111 by using the first change address is enabled. As a result, a validity of the changed address of the slave node A 111 is confirmed without increasing the manufacturing cost.

According to the embodiment described above, the connection state between the master node 102 and each slave node is controlled based on whether the electric power is supplied to each slave node. As a result, it is possible to control the connection state between the master node 102 and each slave node without increasing the manufacturing cost.

The first change address and the second change address are each unique address used in the master slave communication. Therefore, it is possible to set an address which is different for each slave node in the master slave communication.

Although the present invention has been described in the above embodiment, the present invention is not limited to the above embodiment. For example, the connection state between the master node 102 and each slave node may be controlled by providing each of the slave node A 111, the slave node B 112, and the slave node C 113 with a switch to switch connections with the serial data bus 103 and the clock signal line 104 and perming an ON/OFF control on the switch.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-046797, filed Mar. 17, 2020, which is hereby incorporated by reference herein in its entirety.

What is claimed is:

1. A master slave communication system, comprising:
a plurality of slave devices, each of the plurality of slave devices including a register configured to store an initial address; and
a controller including at least one processor and being configured to:
supply an electric power to a first slave device among the plurality of slave devices;
establish a communication between the controller and the first slave device based on the initial address under a state where the first slave device is supplied with the electric power and a second slave device, different from the first slave device, among the plurality of slave devices is supplied with no electric power;
change, when the communication between the controller and the first slave device is established, the initial address stored in the register of the first slave device; and
supply an electric power to the second slave device after the initial address stored in the register of the first slave device is changed.

2. The master slave communication system according to claim 1, wherein
the controller determines whether the communication between the controller and the first slave device is enabled based on a first change address predetermined for the first slave device.

3. The master slave communication system according to claim 1, wherein
the controller establishes a communication between the controller and the second slave device based on the initial address under a state where the second slave device is supplied with the electric power, and
when the communication between the controller and the second slave device is established, the controller changes the initial address stored in the register of the second slave device.

4. The master slave communication system according to claim 1, wherein
the controller establishes a communication between the controller and the second slave device based on the initial address under a state where the second slave device is supplied with the electric power and a third slave device, different from the first slave device and the second slave device, among the plurality of slave devices is supplied with no electric power,
when the communication between the controller and the second slave device is established, the controller changes the initial address stored in the register of the second slave device, and the controller supplies an electric power to the third slave device after the initial address stored in the register of the second slave device is changed.

5. The master slave communication system according to claim 4, wherein
the controller determines whether the communication between the controller and the first slave device is enabled based on a first change address predetermined for the first slave device, and
the controller determines whether the communication between the controller and the second slave device is enabled based on a second change address different from the first change address, the second change address being predetermined for the second slave device.

6. The master slave communication system according to claim 1, wherein each of the plurality of slave devices further includes a memory that stores the initial address.

7. The master slave communication system according to claim 1, further comprising a plurality of power supply lines that supply electric power to the plurality of slave devices, respectively.

8. The master slave communication system according to claim 1, wherein each of the plurality of slave devices further includes a slave processor.

9. A control method for a master slave communication system including a controller and a plurality of slave devices, each of the plurality of slave devices including a register configured to store an initial address, the control method comprising:
supplying an electric power to a first slave device among the plurality of slave devices;
establishing a communication between the controller and the first slave device based on the initial address under a state where the first slave device is supplied with the electric power and a second slave device, different from the first slave device, among the plurality of slave devices is supplied with no electric power;
changing, when the communication between the controller and the first slave device is established, the initial address stored in the register of the first slave device; and
supplying an electric power to the second slave device after the initial address stored in the register of the first slave device is changed.

10. The control method according to claim 9, further comprising
establishing a communication between the controller and the second slave device based on the initial address under a state where the second slave device is supplied with the electric power, and
changing, when the communication between the controller and the second slave device is established, the initial address stored in the register of the second slave device.

11. The control method according to claim 9, further comprising
establishing a communication between the controller and the second slave device based on the initial address under a state where the second slave device is supplied with the electric power and a third slave device, different from the first slave device and the second slave device, among the plurality of slave devices is supplied with no electric power,
changing, when the communication between the controller and the second slave device is established, the initial address stored in the register of the second slave device, and
supplying an electric power to the third slave device after the initial address stored in the register of the second slave device is changed.

12. The control method according to claim 9, further comprising
determining whether the communication between the controller and the first slave device is enabled based on a first change address predetermined for the first slave device.

13. The control method according to claim 11, further comprising
determining whether the communication between the controller and the first slave device is enabled based on a first change address predetermined for the first slave device, and
determining whether the communication between the controller and the second slave device is enabled based on a second change address different from the first change address, the second change address being predetermined for the second slave device.

* * * * *